UNITED STATES PATENT OFFICE.

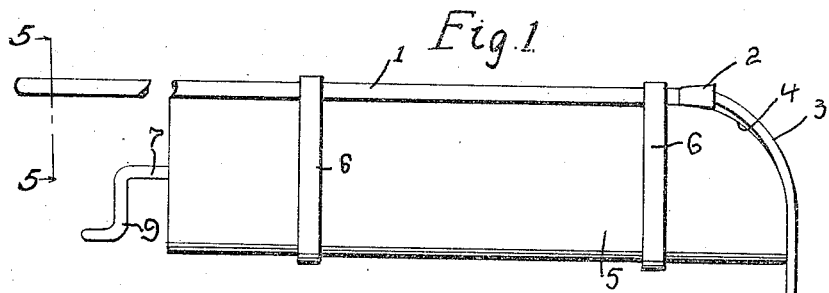
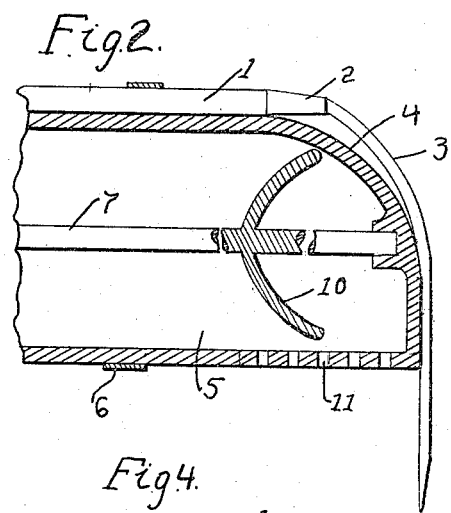
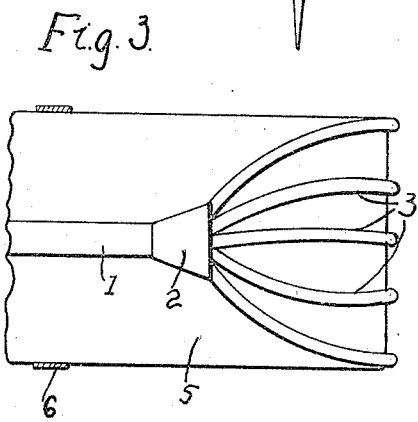
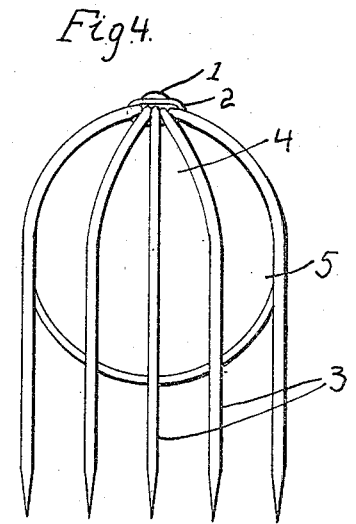
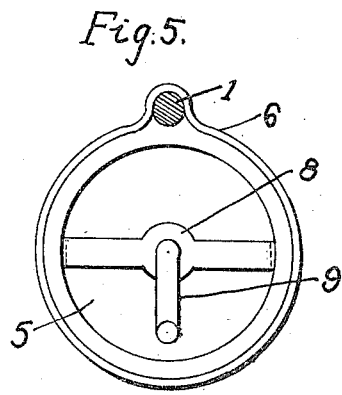

EDITH M. HENNIG, OF BROOKSVILLE, FLORIDA.

FERTILIZER-DISTRIBUTER.

1,283,180.  Specification of Letters Patent.  Patented Oct. 29, 1918.

Application filed October 13, 1917. Serial No. 196,450.

*To all whom it may concern:*

Be it known that I, EDITH M. HENNIG, a citizen of the United States, residing at Brooksville, in the county of Hernando and State of Florida, have invented certain new and useful Improvements in Fertilizer-Distributers, of which the following is a specification.

This invention relates to fertilizer distributers and more particularly to a device adapted to be associated with a rake whereby a quantity of fertilizer may be distributed and be agitated by the rake as the latter is being used for thoroughly working the fertilizer into the soil.

One of the principal objects of the invention is to provide a container having fertilizer arranged therein, the container being so mounted upon a rake handle that the fertilizer may be distributed in the front of the rake when the latter is being used so that the tines of the rake may thoroughly mix the fertilizer as it is dropped from the container.

As a further object of the invention, the device includes the provision of interior agitating elements so arranged to keep the fertilizer thoroughly mixed so that packing and hardening will be prevented thus permitting it to be easily distributed through openings or perforations provided for that purpose.

A further object of this invention is the provision of a fertilizer distributer which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a side elevation.

Fig. 2 is an enlarged fragmentary section through one end.

Fig. 3 is an enlarged fragmentary top plan.

Fig. 4 is an end elevation.

Fig. 5 is an enlarged section taken on the line 5—5 of Fig. 1.

Referring to the drawings, wherein is illustrated the preferred form of my invention, in which like numerals of reference indicate corresponding parts throughout the several views, the rake handle 1 is provided at one end with ferrule 2 from which a plurality of tines 3 are projected. As shown in Fig. 3, these tines diverge from the ferrule and have their uppermost portion curved to fit the curved end 4 of the container 5. The ends of the tines project considerably beyond the opposite marginal edge of the container as shown in Figs. 1 and 4 of the drawing, whereby the tines may engage the soil to thoroughly rake the same while the container will be held out of contact with the ground.

The container 5 is fastened to the handle 1 through the medium of fastening bands 6 and the container may be of any desired length or size to hold a quantity of fertilizer on its interior. Centrally longitudinally mounted in the container is an agitating rod 7 journaled in the forward end of the container and mounted for rotary movement on a bracket 8 mounted on the opposite end of the container as shown in Fig. 5 of the drawing. The end of this rod 7 is bent to form a crank 9 whereby the rod may be rotated and a plurality of agitator blades or fingers 10 are integrally formed with the rod near the rearward end thereof, whereby the material in this end of the container may be thoroughly agitated when the crank is turned. This end of the container is also provided on its bottom, with a plurality of perforations 11 through which the fertilizer is distributed when it is being passed in front of the rake tines. When the agitator is operated, the fertilizer adjacent the opening 11 will be thoroughly mixed and it will be obvious that the fertilizer will freely pass through the openings as the rake is being operated.

When in use, the container 5 will be filled with a quantity of fertilizer of any preferred kind and the rake will be held in the usual manner so that the tines will engage the earth whereupon the rake will be reciprocated in the usual manner and the crank 9 will be turned to work the agitator blade whereby the quantity of the fertilizer will be caused to drop through the openings 11 directly in front of the tines. As the rake is operated, the tines will mix the fertilizer with the soil thus providing fertile land for cultivating purposes.

From the foregoing it will be observed that a very simple and durable fertilizer distributer has been provided the details of which embody the preferred form. I desire it to be understood, however, that slight changes in the minor details of construction may be made without departing from the spirit of the invention or the scope of the claims hereunto appended.

Claim:

In an implement of the character described comprising a handle having a plurality of tines fixed to one end thereof and diverging from the end of the handle whereby the point of the tines are held in laterally spaced relation, the diverging portions of the tines being curved, a container having a curved end, the said container being attached to the handle whereby the said curved end is held in close proximity to the curved portions of the said tines, the latter being in engagement with the container whereby relative movement of the said container on the handle is prevented, and means for discharging material from the container.

In testimony whereof I affix my signature in presence of two witnesses.

EDITH M. HENNIG.

Witnesses:
 E. G. HAMPTON,
 CHAS. B. GALLOWAY.

Copies of this patent may be obtained for five cents each, by addressing the "Commissioner of Patents, Washington, D. C."